April 13, 1943. T. F. O'SHEA 2,316,360
GARBAGE RETORT RECEPTACLE AND GARBAGE DISPOSAL SYSTEM
Filed April 21, 1941 2 Sheets-Sheet 1
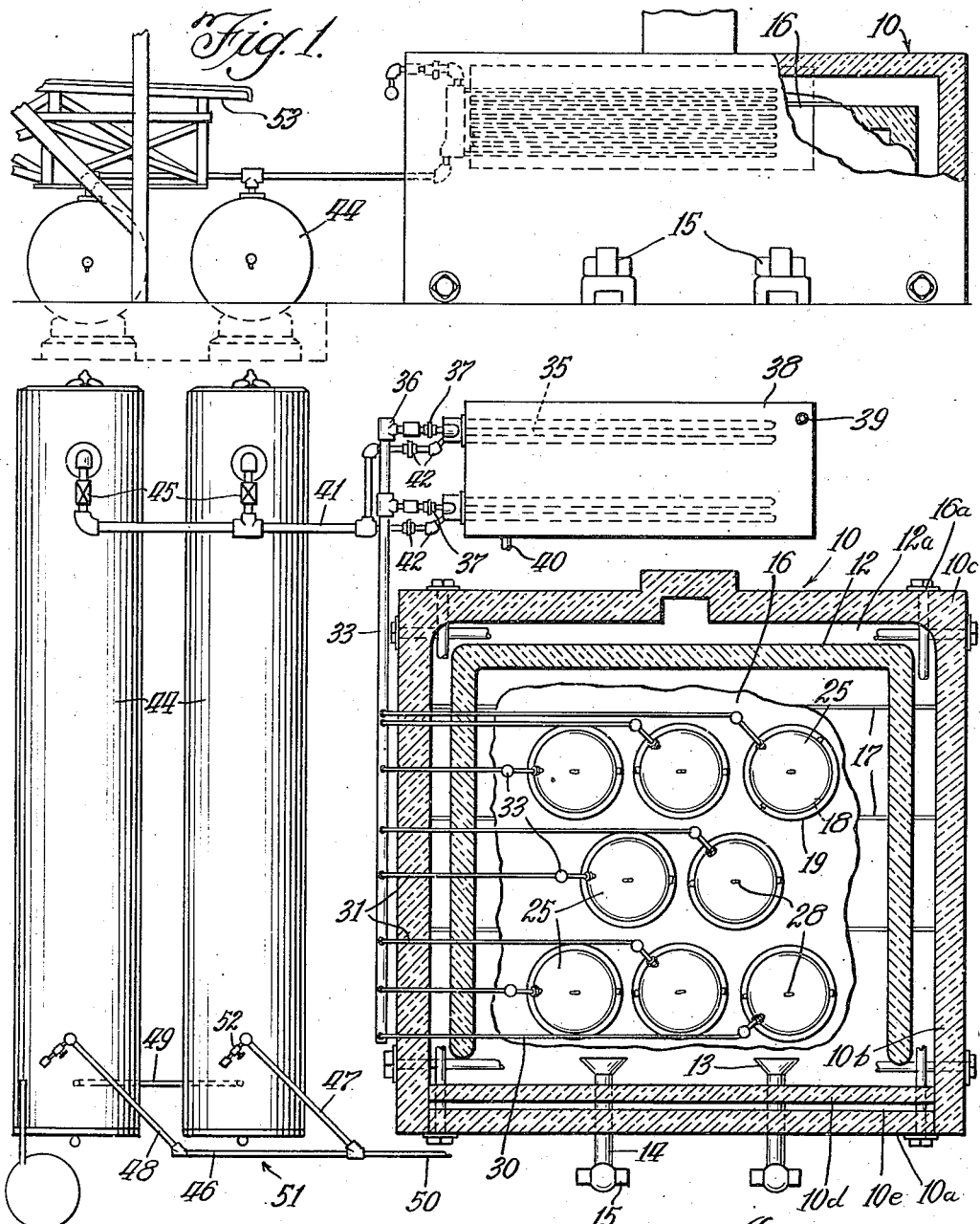
Inventor:
Thomas F. O'Shea
By John F. Brezina
Atty.

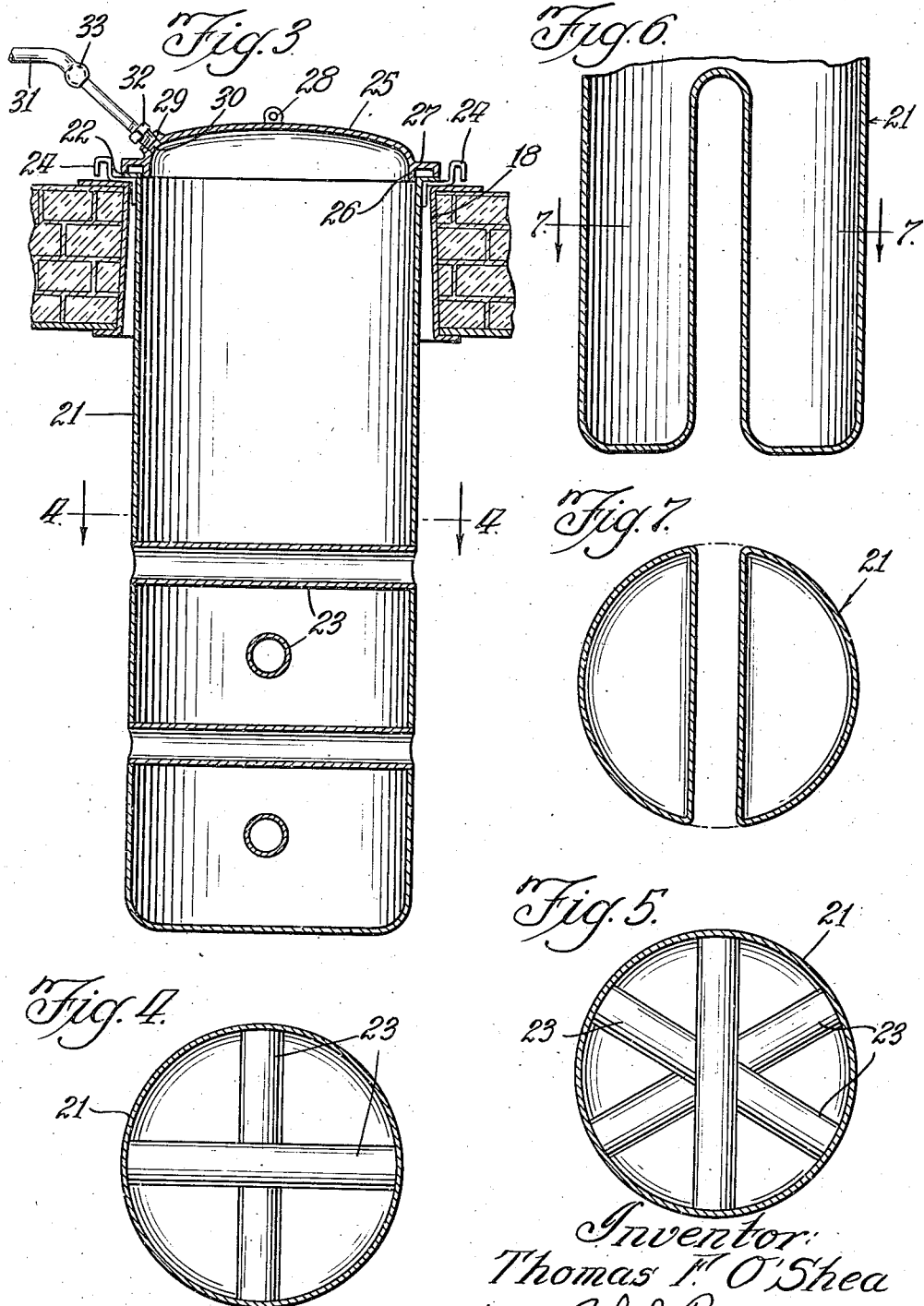

Patented Apr. 13, 1943

2,316,360

UNITED STATES PATENT OFFICE 2,316,360

GARBAGE RETORT RECEPTACLE AND GARBAGE DISPOSAL SYSTEM

Thomas F. O'Shea, Chicago, Ill.

Application April 21, 1941, Serial No. 389,629

2 Claims. (Cl. 202—114)

This invention is directed to novel retort constructions and to the hereindescribed economical method of reduction of garbage and other combustible waste material and which includes separation of condensable material from volatiles of combustion and of distillation.

In presently known garbage disposal methods, it has been found that too long a time is required to reduce common garbage in commonly known cans or receptacles, this being to a large degree due to the high water content of the material and to the fact that such moist material burns gradually inwardly from the outside walls of the receptacle which walls are in direct contact and heat exchange with the furnace heat. This factor causes the central parts of a given contained mass to resist combustion for a relatively longer period than the outer portions of the mass and thereby relatively large amounts of furnace fuel, either gas or oil, are required in addition to consuming such an amount of operating time as to make the reduction too costly.

My invention has for one of its objects, the provision of novel retort receptacles which include structural features enabling relatively high furnace heat to burn the interior portions of a body, mass or column of waste material as rapidly as those portions adjacent the outer wall, this enabling a given mass or body to be reduced to a carbonaceous residue in considerably shorter time than normally required with use of ordinary receptacles and substantially reducing the operating time of the plant.

A further object of my invention is to provide a method of reducing garbage and combustible waste material which includes placing such material in elongated retort receptacles positioning the latter in spaced part-suspended relation in openings of a suitable furnace, leading off the volatile matter and cooling said volatile matter in a continuous step and leading off the condensed residue for later commercial use.

Other and further important objects of my invention will be apparent from the following specification and claims.

This invention, in a preferred form, is illustrated in the accompanying drawings, reference being made thereto in the following description.

On the drawings:

Fig. 1 is a side elevation view illustrating the exterior of a typical installation of my invention, and also illustrating at the left distillate receiving tanks. Fig. 2 is a partially cross sectional and partially top plan view of a typical furnace and a top plan view of the top wall thereof with retorts mounted therein and connected by a system of pipes to cooling apparatus. This view also shows in top plan a typical installation of reservoirs for the condensate material.

Fig. 3 is a vertical cross section view on a larger scale of a retort of my novel construction and illustrating a fragment of the removable lead-off conduit pipes for volatile gases of distillation. Fig. 4 is a horizontal cross sectional view taken on line 4—4 of Fig. 3.

Fig. 5 is a cross sectional view of the retort receptacle of the type illustrated in Fig. 3, though having three diametrically traversing pipes arranged at substantially equal angles. Fig. 6 is an enlarged vertical cross sectional view of the bottom portion of a slightly modified form of retort receptacle, in which the retort receptacle is bifurcated or recessed from its bottom.

Fig. 7 is a horizontal cross sectional view taken on line 7—7 of Fig. 6.

Reference numeral 10 designates generally a suitable furnace having connected front wall 10a, side walls 10b and rear wall 10c, all of which are formed of any suitable material or composition of non-combustible materials, i. e., brick, mortar, steel, or other heat retaining non-conductive elements. Reference numeral 11 designates the top wall or roof of the normally enclosed furnace which may be made of either metal, brick, combinations thereof or of materials like those above stated. Reference numeral 10d designates an inner lining or secondary wall parallel to and spaced from front wall 10a and providing an insulating air space 10e as illustrated in Fig. 2.

The size and shape of the furnace 10 may be varied according to the particular local requirements and of the volume of garbage and waste material to be reduced. Said furnace 10 is preferably provided with one or more continuous baffle walls 12 of suitable non-conductive material, i. e. refractory brick, metal, etc., which in the illustration shown is of substantially U-shaped horizontal cross section and is a continuous unit as illustrated in Fig. 2. The baffle 12 provides the vertically extending U-shaped space 12a.

Numeral 13 refers to typical nozzles, two or more in number, of suitable fuel burner (not shown), and which are preferably of the gas burning type, though liquid fuel may be also satisfactorily utilized. Said fuel burner nozzles are illustrated as connected by pipes 14, which pass through walls 10a and 10d, with fuel supply conduit pipes 15, only two segments of which are shown in Fig. 2. In Fig. 1, I have illustrated in reduced proportion and in outline only the exterior portions of typical controllable fuel burners which regulate the inflow of fuel fed to the interior combustion chamber of the reduction furnace.

In Figs. 1 and 2, I have illustrated only a portion of the stack which leads volatile gases of combustion upwardly from the furnace, said stack being formed contiguous with the wall 10c of the furnace 10.

In Fig. 2 I have illustrated only the central part of the roof or top wall 16 of the furnace, the outer portions being broken away to expose the respective vertical walls in cross section. The top wall 16 is preferably formed of cement bonded refractory brick or other suitable heat resistant material, or combinations thereof with metal connecting and anchoring elements (not shown). Said top wall is additionally supported by a plurality of metal cross beams or trusses 17, only the end portions of which are illustrated in Fig. 2. Numerals 16a designate suitable metal tie rods having end nuts threaded thereon which traverse the furnace adjacent the side walls thereon and which strengthen and reinforce the same.

Numerals 18 designate a plurality of suitably spaced preferably round holes or openings formed in top wall or roof 16. A metal flanged collar 19 is mounted on each of the openings 18 as illustrated in Fig. 3. Said collars preferably have both upper and lower annular integral retaining flanges as indicated which anchor said collars in said openings respectively. Said collars 19 are preferably so formed that the inner surfaces are slightly inclined outwardly and downwardly, or enlarged, so that retorts herein described may be more easily inserted and withdrawn.

Referring to Figs. 3 and 4, numeral 21 designates a substantially cylindrical metal retort, hereinafter also referred to as retort receptacle having a circumferential wall, and integral flat bottom which merges with said wall in a gradually curved or rounded portion which eliminates an objectionable relatively sharp corner possessed by most cylindrical units. The upper peripheral edge of said circumferential retort wall is formed with an outwardly projecting annular metal flange 22 which preferably extends at right angles as shown.

In order that the inner portions of the body of garbage or waste material contained within each of the retorts 21 may be more quickly burned and reduced as herein described, I provide each of the retorts 21 with a plurality, preferably four or five, of transversely extending metal conduits or pipes 23. The opposite ends of said metal conduits or pipes 23 are secured by welding or the like in substantially diametrically opposite openings formed in the circumferential side wall of the retort in such a manner that both ends of said conduits or pipes 23 open exteriorly of the receptacle and so that their interiors are sealed from the inside chamber of each of the retorts respectively.

I desire it to be understood that the number and spacing between the respective pipes 23 may be varied as desired though in the illustrations shown I have indicated four thereof in one form and three thereof in another. Further, the conduits are preferably mounted in substantially the illustrated spaced apart positions and substantially diametrically of each retort receptacle and in vertical planes intersecting each other as well as in different substantially horizontal planes. I desire it to be also understood that said pipes 23 need not be perpendicular as is the case of the illustration, but may also be inclined and diagonal and at various angles to the circumferential wall of each retort receptacle.

A further function is accomplished by these novel features of the combination of transverse conduits or pipes in each of the retorts 21 in that such pipes permit the relatively high heat of combustion within the furnace to enter and circulate through said conduits 23 to more rapidly raise the heat of the inner portions of the body of garbage or waste material within each retort and thereby more quickly effect its combustion and reduction in the manner herein described. This factor and accomplishment is of particular importance when considering the high moisture and water content of the general run of garbage to be reduced inasmuch as in presently known garbage receptacles, the garbage is rather slowly burned from the outside of the body and gradually inwardly to result in both a materially slower combustion and reduction as well as resulting in a core or residue body in the center of the can which is partially insulated from relatively rapid combustion and reduction due to the formation of surrounding residual carbonaceous and solid matter. With the utilization of the novel construction of retort receptacles of the herein described and claimed construction, the combustion and reduction of the normally relatively moist garbage is materially shortened and the inner portions of the body of material is burned substantially as rapidly as those portions adjacent the outer wall of each retort receptacle.

Reference numeral 24 designates a pair of suitable angular metal anchoring hooks or eyelets which are preferably positioned at diametrically opposite points of each of the retorts 21 and have their lower ends secured by welding or the like to the outer surface of the retort as shown in the upper portion of Fig. 3. Each of the anchoring hooks or eyelets 24 are bent to extend outwardly and thence upwardly so that they will normally rest upon the surface of the metal collar in which the particular retort is removably mounted, and such hooks thereby are substantially protected against the relatively high temperature within the furnace which otherwise would effect deterioration and attainment of undesirable brittleness which would result in frequent breakage.

I desire it to be understood that the location of the hooks 24 may be transposed and varied from the specific illustration of the drawings, and that such hooks may for example be equivalently mounted within the garbage retort adjacent the upper periphery thereof and extending slightly inwardly of said retort receptacle.

Each of the waste material retorts 21 are adapted to be removably closed by a suitable metal cover 25 of shape substantially conforming to the upper open end of the retort. Each of the metal covers 25 have a downwardly and inwardly extending flange 26 and a radially and outwardly extending integral metal flange 27, the latter flange being adapted to rest upon the vertical flange 22 of each of the retorts. The outer annular edge of the metal flange 27 is preferably formed to extend downwardly to thereby provide a relatively shallow air space between such downwardly extending integral flange 26. The downwardly extending annular flange 26 preferably extends to a point where it will be a short distance below the upper surface of the retort flange 22 and to thereby hold said cover from undesirable transverse movement.

Each of the metal retort covers 25 are preferably provided with a secured or integrally formed eyelet 28 by means of which the cover may be manually or mechanically raised with the aid of a suitable engaging tool, and each of said covers are also provided with an integral nipple 29, which defines an outlet port 30. An adjustably mounted nozzle 32 is movably and swivelly connected by means of a suitable passaged ball joint 33 to conduits or pipes 31, only a fragment of one of which pipes is shown at the left of Fig. 3.

In Fig. 2, I have illustrated eight of the retorts 21 mounted in the top wall of the furnace and within their respective annular metal collars 19, all of said collars being suitably spaced and preferably staggered to provide relatively unobstructed circulation of heat within the furnace. In Fig. 2 each of the retort covers 25 are illustrated as communicatively connected by means of their respective pipes 31 to a main header or lead off pipe 34. Each of the outlet pipes 31 preferably include suitable elbows or other suitable fittings by which their outer ends shown at the left of the furnace of Fig. 2 are connected respectively to the main header or lead off pipe 34 and said mountings and connections provided by such fittings are such as to permit each of said pipes 30 to be swung in vertical plane whenever it is desired to disconnect one of the nozzles 32 from seated engagement in the cover 25 preliminary to lifting out of the retort normally below said cover.

It will be apparent that whenever it is desired to either manually or by mechanical means lift out one of the retorts 21, the outlet pipe 31 leading therefrom may be manually raised a relatively short distance to thereby withdraw the engaging reduced end of the nozzle 32 from seating engagement in the outlet port 30 of metal cover 25, and thereupon the metal cover is lifted and placed aside either manually or by suitable mechanical, air operated or electrically operated and manually controlled lifting devices which may include cable connected hook elements. Such hook elements are engaged in the eyelets or hooks 24 and the can lifted from its position in the furnace and thereabove and thence moved by such mechanical or electrically operated device to the point of dumping at which point the powder-like carbonaceous residue is dumped. In the practice of my invention, said carbonaceous residue formed from the reduction of general run of garbage is found to be carbon which is sold for re-use in various manufacturing processes.

In normal operation, I have found that the most desirable temperature to be maintained is approximately from 1400° to 1600° F., though a wider range of temperature may be utilized satisfactorily according to the characteristics of the waste material being reduced. The average range of time required for proper distillation and reduction when the furnace temperatures are maintained near 1500° F. is approximately one and three-fourth hours.

Referring to Figs. 1 and 2, one end of the relatively larger header and outlet pipe 34 is communicatively connected to the inlet ends of condensing or cooling metal pipe coils 35 by means of suitable pipe fittings 36 and unions 37 respectively. While I have illustrated in one form only two of such condenser coolers, it is to be understood that both the number and sizes may be varied according to the particular requirements of the installation. Said metal pipe condensers and coolers 35 are preferably disposed in a substantially vertical plane and the outlet connections formed from the header pipe 34 are connected to the upper ends thereof so that as the volatile gases of distillation of the garbage are led off, they will travel in a zigzag and gradually downward path in heat exchange relation with a liquid cooling medium which is circulated through the tank 38 and into and out of suitable inlet and outlet connections 39 and 40 thereof, it being understood that such inlet and outlet connections form part of a closed path through which the liquid cooling medium is circulated by conventionally known means (not shown). The lower ends of each of the cooling and condensing coils 35 are communicatively connected to an outlet pipe 41 by means of suitable connection fittings 42 which include the unions, elbows and nipples as illustrated.

At the left of Figs. 1 and 2, I have illustrated a pair of typical metal tanks 44 which are mounted at levels below the outlet pipe 41 and below the level of the outlet ends of the cooling and condensing coils 34. The pipe 41 is communicatively connected with suitable inlet ports of said tanks 44 respectively by suitable pipe fittings 45 as illustrated.

As will be clearly seen from Fig. 1, the portions of the volatile matter which are condensed to liquid or substantially liquid form during travel through the cooler and condenser coils 34 will run by gravity into the respective reservoirs and tanks 44.

At the left of Fig. 2 I have illustrated a conduit 46 which has communicatively connected branch conduits 47 and 48 and which in turn are connected by suitable pipes and fittings to suitably located outlet ports (not shown) in the upper part of tanks 44, by conventional connected pipe fittings designated generally as 51 and which include the manually operable control valves 52.

The liquid or substantially liquid residue which run through the tanks or reservoirs 44 produces a substantial amount of methane gas which evaporates and accumulates in the upper portions of tanks 44 and above the liquid bodies therein, and I utilize such methane gas as an auxiliary fuel and lead the same through pipes 46, 47 and 50 to points adjacent the nozzles 13 through which the primary gas or liquid fuel is introduced into the furnace.

The liquid residue which accumulates in these reservoirs or tanks 44 is drained off at desirable intervals according to the rapidity of accumulation thereof.

Pipe 49 is positioned below the lowest part of the tanks 44 and communicatively connects such tanks in order to maintain a common fluid level within said tanks 44. A suitable drain (not shown) may be provided in said pipe 49 whereby said tanks are drained as aforesaid.

In the upper left of Fig. 1, I have only schematically illustrated a portion of a typical dumping platform with supports designated generally by reference numeral 53. Said platform is preferably positioned at the closest possible location to the furnace so that the empty cans may be refilled with the least possible labor and transport, and wherein said cans may be lowered and raised by suitable hoisting apparatus (not shown) to permit economical handling.

The liquid residue which accumulates by the aforedescribed process in tanks 44 contains on an average of 96% water and the balance consists of fats and various chemicals. The water is allowed to run down the sewer and fats and chemicals recovered for commercial use.

It is understood that various modifications may be made in the design and structure of my aforesaid invention provided, however, that such modifications come within the spirit and scope of the claims thereof.

I claim:

1. In an apparatus for waste disposal including a distillation furnace, a relatively large combustion chamber defined by a bottom side wall and substantially flat top wall; upwardly extending heat-resistant baffles in said furnace; said top wall of said furnace being provided with a plurality of spaced apart annular openings; metal mounting collars mounted in said top wall and defining said spaced apart openings respectively; a plurality of substantially cylindrical retort receptacles removably mounted in said top wall openings, each of said retort receptacles having a peripheral supporting flange on their upper ends; adapted to cooperate with said collars whereby to support each retort with its major portion projecting through its corresponding opening in the top wall of the furnace; a plurality of transversely extending conduit pipes connected to and opening exteriorly of the walls of each retort receptacle respectively; removable covers on said receptacles, each of said covers having an outlet port therein, an outlet header mounted adjacent said furnace; a plurality of outlet pipes header to permit swinging movement thereof; and outlet pipes being movable with respect to said header to permit swinging movement thereof; and a nozzle movably connected on the end of each of said outlet pipes and communicating therewith, said nozzles being removably mountable in said retort cover ports, said header, outlet pipes and nozzles providing means for leading off volatile matter of distillation.

2. In a garbage reduction apparatus, a furnace defining a combustion chamber including a top wall having openings therein; a plurality of metal mounting collars mounted in said top wall openings; and a plurality of substantially cylindrical retort receptacles removably mounted in said top wall openings, each of said retort receptacles having peripheral flanges by means of which said receptacles are suspended within the combustion chamber by said collars; each of said retort receptacles having a plurality of transverse pipes opening exteriorly thereof and into said combustion chamber whereby the furnace heat will effect more rapid distillation and reduction of the central portions of the waste material body within each of said retort receptacles.

THOMAS F. O'SHEA.